United States Patent [19]
Chen et al.

[11] Patent Number: 5,943,187
[45] Date of Patent: Aug. 24, 1999

[54] CARBON OVERCOAT FOR A SLIDER WITH IMPROVED STEP COVERAGE

[75] Inventors: Pei C. Chen, Cupertino; Cherngye Hwang, San Jose; Vedantham Raman, San Jose; Jila Tabib, San Jose, all of Calif.

[73] Assignee: International Business Machines Corporation, Armonk, N.Y.

[21] Appl. No.: 08/878,976

[22] Filed: Jun. 18, 1997

[51] Int. Cl.⁶ .................................. G11B 5/60; G11B 5/82
[52] U.S. Cl. ............................................. 360/103; 360/135
[58] Field of Search .................................... 360/103, 122, 360/131–136

[56] References Cited

U.S. PATENT DOCUMENTS

| | | | |
|---|---|---|---|
| 4,327,387 | 4/1982 | Plotto | 360/103 |
| 5,151,294 | 9/1992 | Bleich et al. | 427/11 |
| 5,323,283 | 6/1994 | Sano | 360/103 |
| 5,386,400 | 1/1995 | Nakayama et al. | 369/13 |
| 5,416,048 | 5/1995 | Blalock | 437/228 |
| 5,544,775 | 8/1996 | Kerth et al. | 216/65 |

FOREIGN PATENT DOCUMENTS

| | | | |
|---|---|---|---|
| 63-276769 | 11/1988 | Japan | G11B 21/21 |
| 4-102210 | 4/1992 | Japan | G11B 5/31 |
| 5-128467 | 5/1993 | Japan | G11B 5/60 |
| 7-98950 | 4/1995 | Japan | G11B 21/21 |
| WO 96/19803 | 6/1996 | WIPO | |

Primary Examiner—A. J. Heinz
Attorney, Agent, or Firm—Gray Cary Ware Freidenrich

[57] ABSTRACT

A method is provided for applying an overcoat to a slider and sensitive elements of a magnetic head which has improved coverage, reduced spacing loss and improved corrosion resistance. After lapping, an overcoat material is sputter deposited on the air bearing surface (ABS) of the slider, followed by a step of sputter etching the overcoat. The sputter etching redeposits material from high points on the slider and fills in trenches formed during the lapping process. The redeposition of the overcoat from the high places to the low places of the slider decreases the overall thickness of the overcoat, thereby decreasing spacing loss. The filling of the trenches implements increased coverage which increases wear resistance of the slider and more adequately protects the sensitive elements of the magnetic head from corrosion. In a preferred embodiment, a portion of the overcoat is left on the high places to ensure that the sputter etching does not damage the sensitive elements of the magnetic head. If the overcoat is completely etched from the high places an optional second overcoat may be applied which is thinner than the first overcoat. This method may also be applied to other articles such as a magnetic disk.

27 Claims, 10 Drawing Sheets

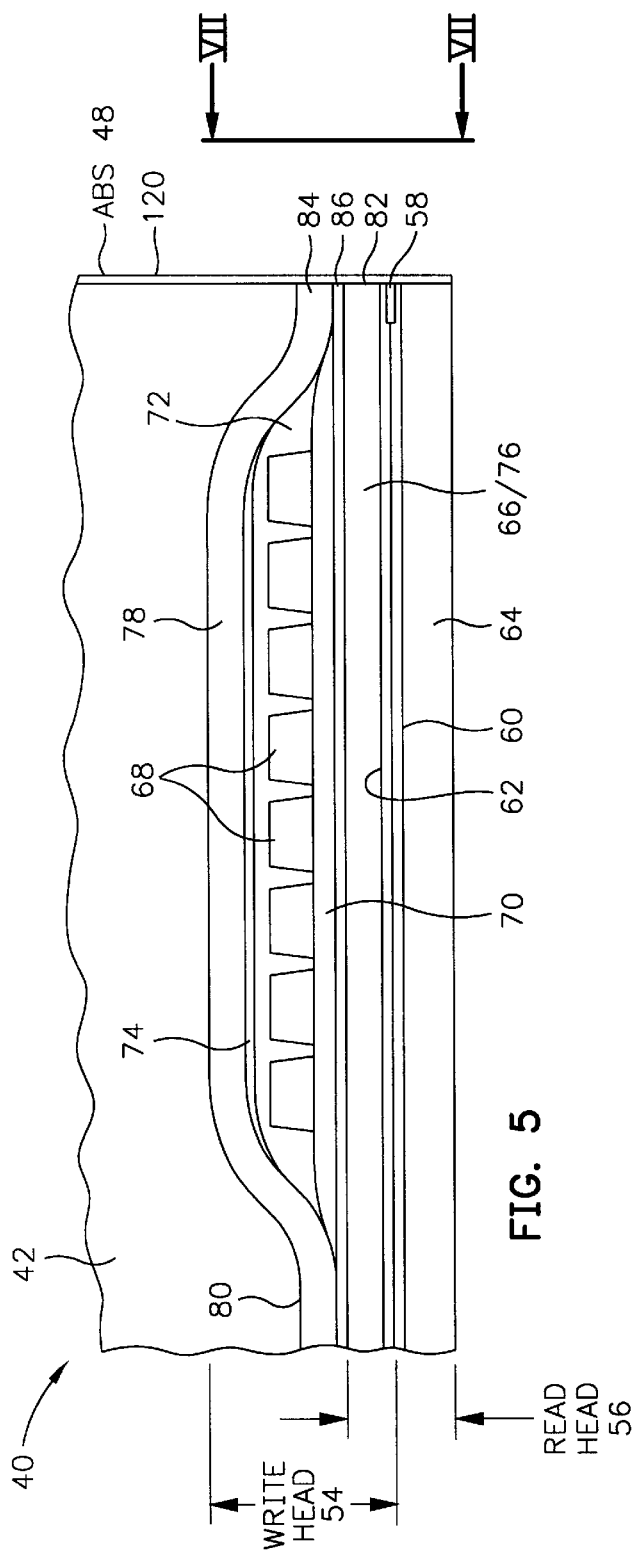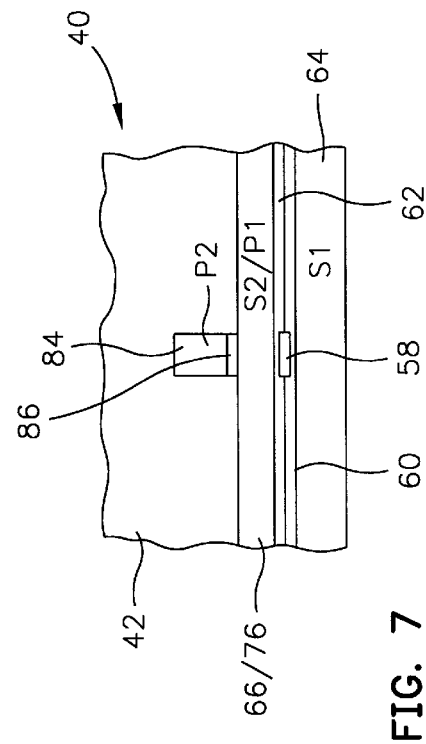

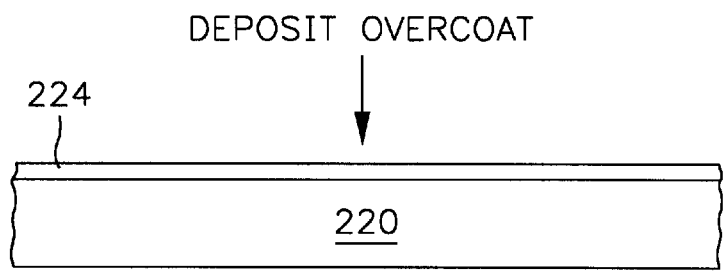
FIG. 19A
FIG. 19B
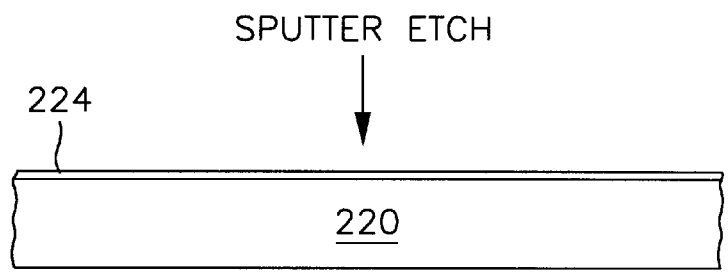
FIG. 19C
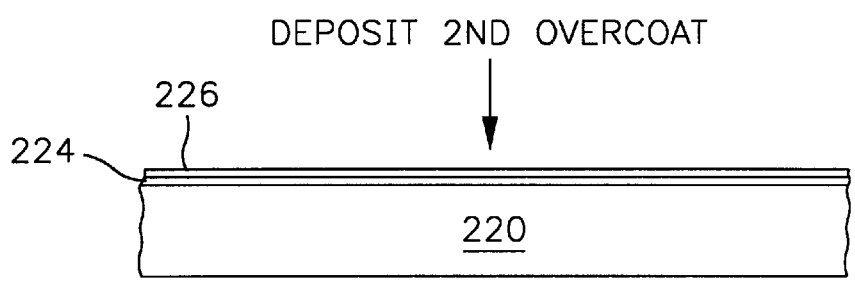
FIG. 19D

CARBON OVERCOAT FOR A SLIDER WITH IMPROVED STEP COVERAGE

BACKGROUND OF THE INVENTION

1. Field of the Invention

The present invention relates to a carbon overcoat for a slider with improved step coverage, and more particularly, to a carbon layer on an air bearing surface of the slider which is redeposited in scratches or trenches to improve spacing loss, corrosion resistance and smoothness.

2. Description of the Related Art

A write head is typically combined with a magnetoresistive (MR) read head to form a merged MR head, certain elements of which are exposed at an air bearing surface (ABS). The write head comprises first and second pole pieces connected at a back gap which is recessed from the ABS. The first and second pole pieces have first and second pole tips, respectively, which terminate at the ABS. An insulation stack, which comprises a plurality of insulation layers, is sandwiched between the first and second pole pieces and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips so that write fields of the first and second pole tips at the ABS fringe across the gap layer.

In a magnetic disk drive a magnetic disk is rotated adjacent to and a short distance (fly height) from the ABS so that the write fields magnetize the disk along circular tracks. The written circular tracks then contain magnetized segments with fields detectable by a read head. An MR read head includes an MR sensor sandwiched between first and second non-magnetic gap layers and located at the ABS. The first and second gap layers and the MR sensor are sandwiched between first and second shield layers. In a merged MR head the second shield layer and the first pole piece are a common layer. The MR sensor detects magnetic fields from the circular tracks of the rotating disk by a change in resistance which corresponds to the strength of the fields. A sense current conducted through the MR sensor results in voltage changes received by the processing circuitry as readback signals.

Hereinafter, for reasons apparent to the skilled artisan, the first and second pole tips, the gap layer, and the MR sensor of a merged MR head, are referred to as "sensitive elements".

One or more merged MR heads may be employed in a magnetic disk drive for reading and writing information on circular tracks of a rotating disk. A merged MR head is mounted on a slider carried on a suspension. The suspension is mounted to an actuator which rotates the magnetic head to locations corresponding to desired tracks. As the disk rotates an air cushion is generated between the rotating disk and an air bearing surface (ABS) of the slider. A force of the air cushion against the air bearing surface is opposed by an opposite loading force of the suspension, causing the magnetic head to be suspended a slight distance (flying height) from the surface of the disk. Flying heights are typically on the order of about 0.05 $\mu$m.

A magnetic head has a magnetic height corresponding to the distance between the center of a magnetizable layer on a magnetic disk and surfaces of the afore-mentioned sensitive elements facing the magnetic disk. This spacing is the aggregation of one-half the thickness of the magnetizable layer, the thicknes overcoat on the magnetizable layer, the flying height, the thickness of any overcoat on the slider and on the sensitive elements, and, sometimes a recession of the sensitive elements from a nominal plane of the slider. The sum of these thicknesses and heights determines the spacing loss of a magnetic head because it reduces the bit density achievable by the head. In this regard, bit density is the number of bits written by a head per square inch of a magnetic disk. When the sensitive elements of the magnetic head are positioned closer to the disk, bit density increases because bits are written closer together along a track and more tracks are written per width of the disk.

The slider and the sensitive elements of a magnetic head are subjected to wear during take off and landing of the slider with respect to the magnetic disk. When the sensitive elements are worn, their dimensions change and reduce the quality of head performance. Accordingly, an art has developed to provide an overcoat for the slider and sensitive elements of a magnetic head; this overcoat is sometimes referred to as a wear layer. There is a strong felt need to keep the overcoat as thin as possible in order to minimize its contribution to spacing loss.

During construction, the ABS of a slider and the sensitive elements of a magnetic head are lapped by a grinding or polishing process. The material of the slider may be AlTiC which is typically 70% $Al_2O_3$ and 30% TiC. The material of the sensitive elements is typically NiFe. Lapping causes scratches or trenches in a slider's ABS and in the sensitive elements of a magnetic head. The trenches have side walls and are bounded by peaks and valleys. A typical peak-to-valley dimension can be 10 nm after lapping.

A typical overcoat may include a 1 nm adhesion layer of Si under a 9 nm carbon layer. These layers are usually formed on the ABS of the slider and the sensitive elements by sputter deposition. Since sputter deposition is very directional, the layers do not cover vertical (perpendicular to ABS) or near vertical side walls of walls of the trenches. The layers cover the peaks and flat surfaces and, to a lesser extent, sloping surfaces. Uncovered side walls are potentially exposed and can corrode. Further, material deposited on the peaks and flat surfaces increases the thickness of the overcoat layer and, with it, the spacing loss.

SUMMARY OF THE INVENTION

One embodiment of the present invention provides an overcoat for a slider ABS of the slider and the sensitive elements of a magnetic head that is thinner than prior art overcoats and provides full coverage of the lapped surface of a slider including side walls and sensitive elements. After lapping the ABS, the overcoat material is sputtered on the lapped surface, covering the peaks, as discussed hereinabove. Next, the overcoat material is etched by sputter etching or ion beam milling which removes the overcoat material from the peaks, and redeposits it on the side walls of trenches in the lapped surface. From experiments we have found that the etching step at least partially fills the trenches with the overcoat material. The result is a thin overcoat with virtually full coverage of all topographical features on a lapped slider surface. In a preferred embodiment we leave a portion of the overcoat material on the flat surfaces to ensure that the etching does not damage the sensitive elements. In another embodiment, however, the overcoat material may be removed from the flat surfaces by a milling step that is followed by another sputter deposition step depositing a second overcoat which is thinner than the first overcoat. This fabrication method results in a new product wherein trenches in a lapped slider surface are filled with redeposited overcoat material. As a result the overcoat is significantly thinner than in the prior art. The method can be employed for applying an overcoat to any article where a protective layer is desired, such as a magnetic disk.

An object of the present invention is to provide a sputtered overcoat for an article which has improved step coverage.

Another object is to provide a protective overcoat for a lapped slider surface including sensitive elements of a magnetic head that fills in scratches and, as a result, is thinner than a typical sputtered overcoat.

A further object is to provide a method of making an overcoat on a surface of an article wherein the overcoat is redeposited from flat portions of the surface to side walls of scratches in the surface.

Still another object is to provide a method of forming a protective overcoat on a lapped ABS of a slider which fills in scratches due to the lapping with redeposited overcoat material initially deposited by sputter deposition.

Still a further object is to provide a method of sputter deposition and etching for making a protective overcoat on an article which provides better coverage and less thickness.

Other objects and attendant advantages of the invention will be appreciated upon reading the following description taken together with the drawings.

BRIEF DESCRIPTION OF THE DRAWINGS

FIG. 5 is a partial view of the slider and magnetic head as seen in plane V—V of FIG. 2;

FIG. 7 is a partial ABS view of the slider taken along plane VII—VII to show the read and write elements of the magnetic head with the overcoat layer removed;

FIGS. 19A–19D show various steps in forming an overcoat on a magnetic disk according to the present invention.

DESCRIPTION OF THE PREFERRED EMBODIMENTS

Figure 1:
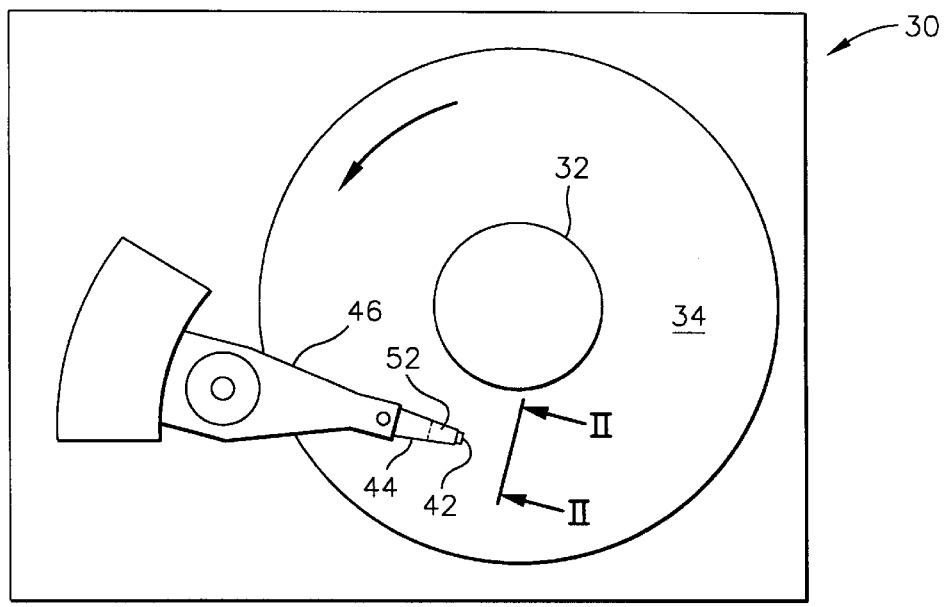
FIG. 1 is a planar view of an exemplary magnetic disk drive.
Figure 2:
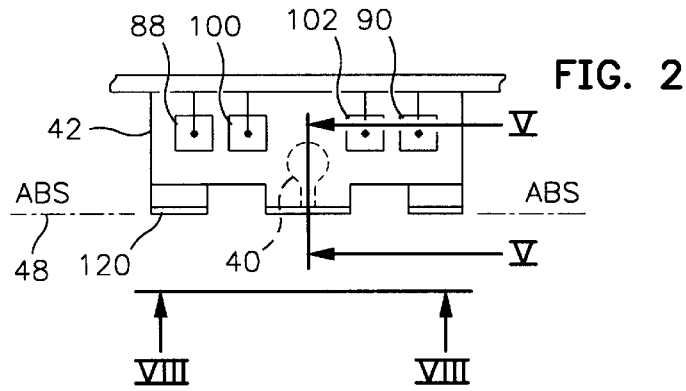
FIG. 2 is an end view of a slider with a magnetic head of the disk drive as seen in plane II—II.
Figure 3:
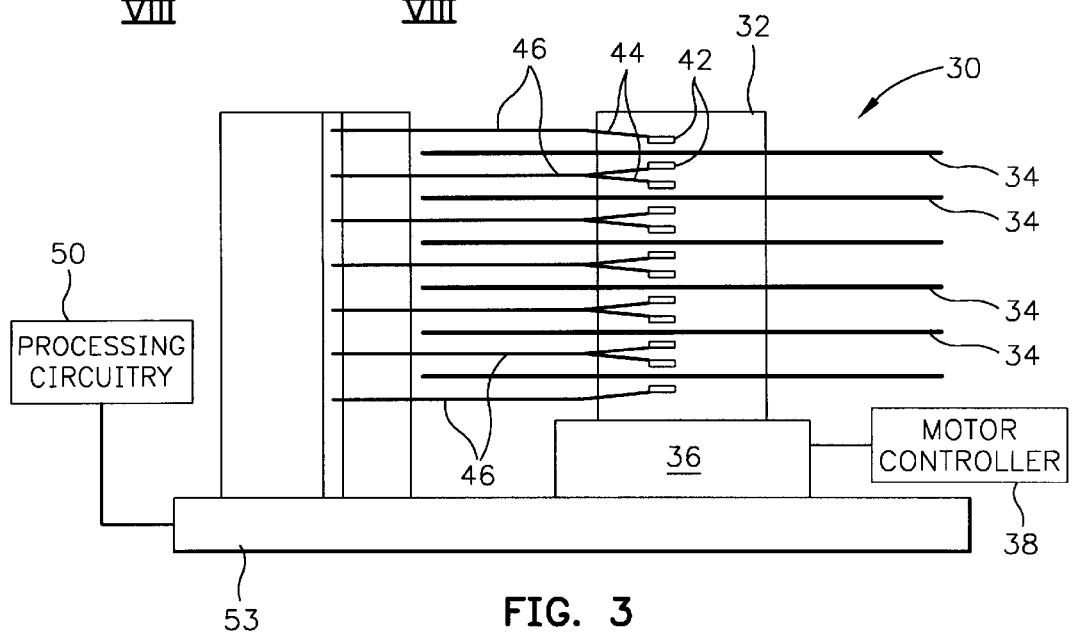
FIG. 3 is an elevation view of the magnetic disk drive wherein multiple disks and magnetic heads are employed.

Referring now to the drawings, wherein like reference numerals designate like or similar parts throughout the several views, a magnetic disk drive 30 is illustrated in FIGS. 1–3. The drive 30 includes a spindle 32 which supports and rotates a magnetic disk 34. The spindle 32 is rotated by a motor 36 which, in turn, is controlled by a motor controller 38. A horizontal combined magnetic head 40 for reading and recording is mounted on a slider 42 which, in turn, is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 $\mu$m) cushion of air (air bearing) between the disk and an air bearing surface (ABS) 48.

Figure 4:
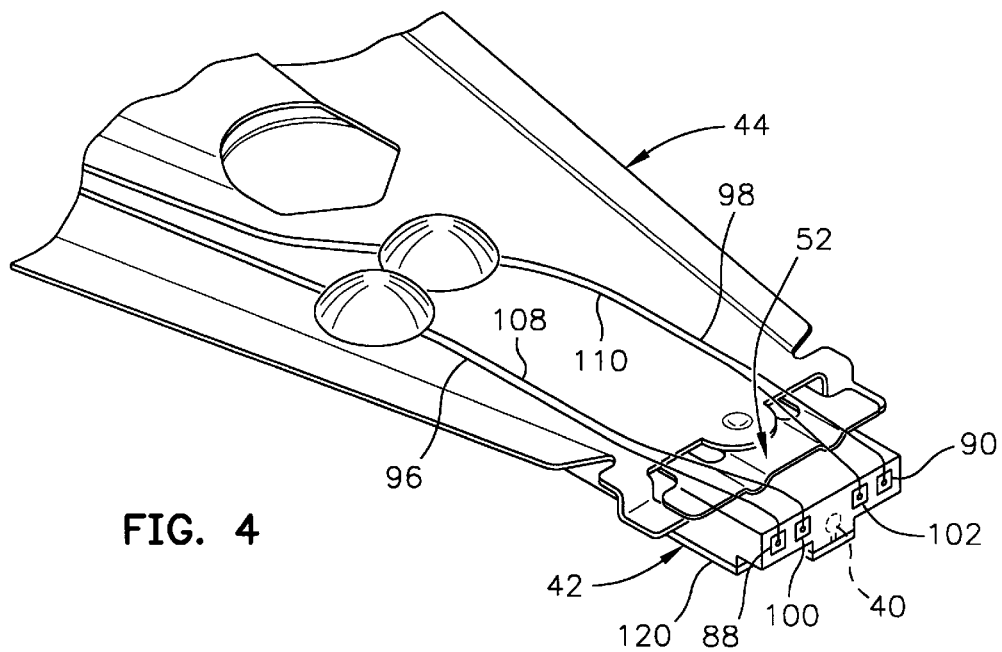
FIG. 4 is an isometric illustration of an exemplary suspension system for supporting the slider and magnetic head.

The magnetic head 40 may then be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 which in turn is mounted to the suspension 44. All of the above components are supported on a base 53.

FIG. 5 is a side cross-sectional elevation view of a merged magnetoresistive (MR) head 40 which has a write head portion 54 and a read head portion 56. The read head portion includes an MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes which are processed by the processing circuitry 50 shown in FIG. 3.

Figure 6:
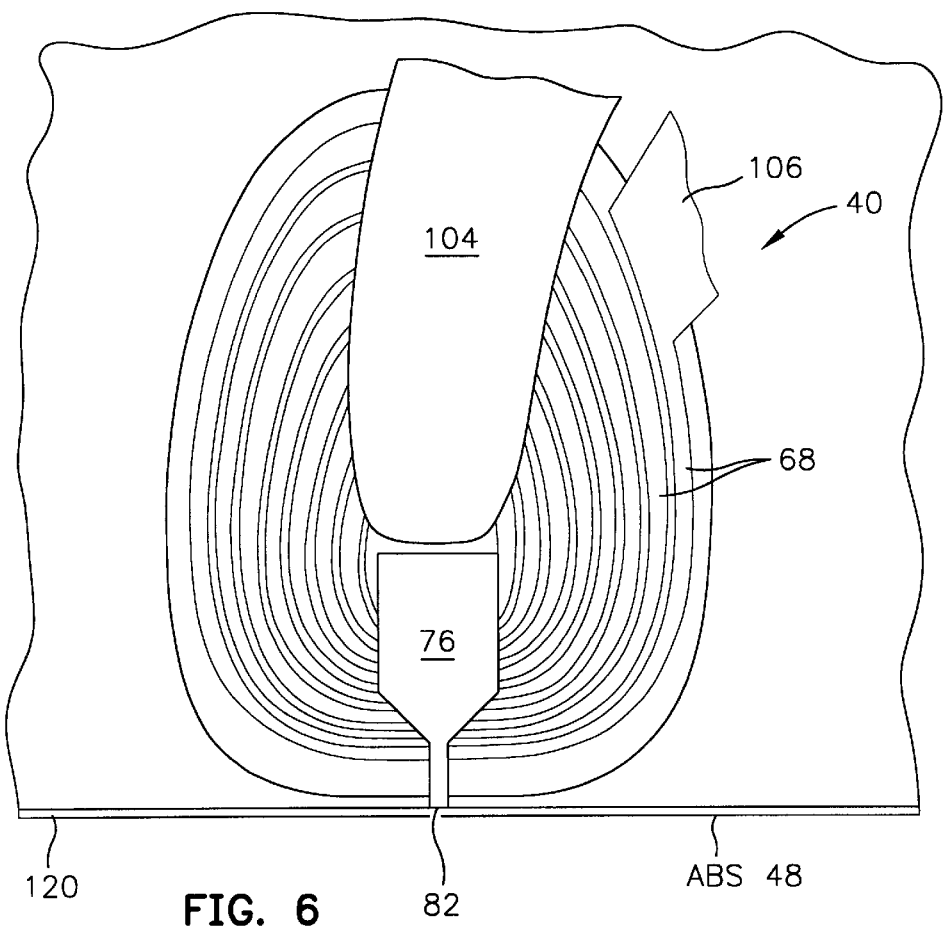
FIG. 6 is a view taken along plane VI—VI of FIG. 5 with all material above the second pole piece removed and with a portion of the head back of the back gap shown to illustrate the complete coil.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to in the art as an "insulation stack". The coil layer 68, and the first, second and third insulation layers 70, 72 and 74 are sandwiched between first and second pole piece layers 76 and 78. The first and second pole piece layers 76 and 78 are magnetically coupled at a back gap 80 and have first and second pole tips 82 and 84 which are separated by a non-magnetic gap layer 86 at the ABS. As shown in FIGS. 2 and 4, first and second solder connections 88 and 90 connect leads (not shown)

from the MR sensor 58 to leads 96 and 98 on the suspension 44 and third and fourth solder connections 100 and 102 connect leads 104 and 106 from the coil 68 (see FIG. 6) to leads 108 and 110 on the suspension.

Figure 8:
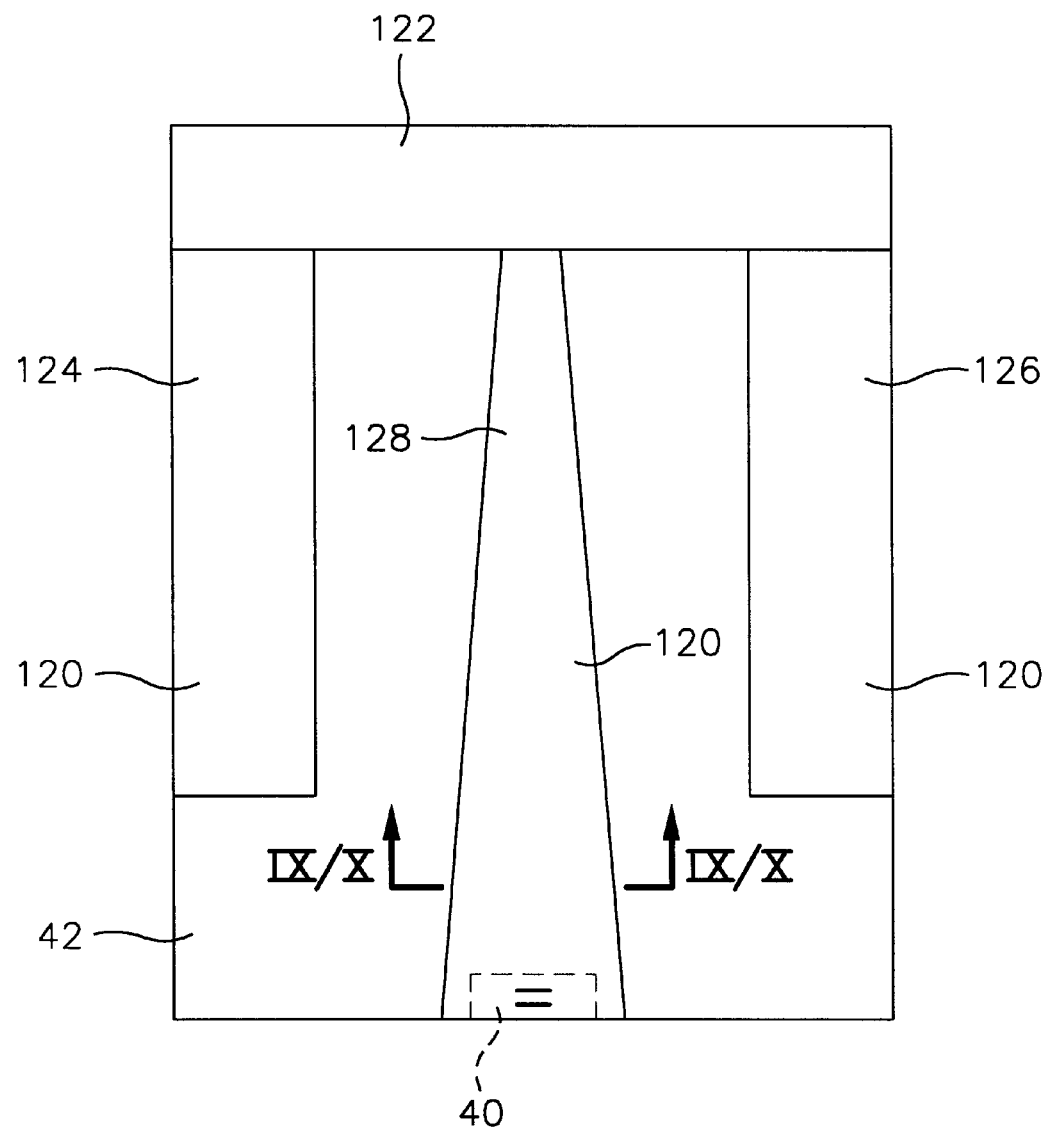
FIG. 8 is a view taken along plane VIII—VIII of FIG. 2.

An overcoat 120 is shown on the slider 42 and the sensitive elements 58, 82, 84 and 86 of the magnetic head in FIGS. 2, 4, 5, 6 and 8. An overcoat is required to prevent wear and corrosion of the sensitive elements. As shown in FIG. 8, the slider 42 has a taper 122 at a leading edge, side rails 124 and 126 and a center rail 128, the center rail 128 extending to a trailing edge of the slider for supporting the magnetic head 40. In the manufacture of the slider, the rails 124, 126 and 128 and the ABS of the magnetic head 40 are lapped by a grinding process which leaves minute scratches thereon, the scratches appearing as trenches when viewed with an atomic force microscope (AFM).

Figure 9:
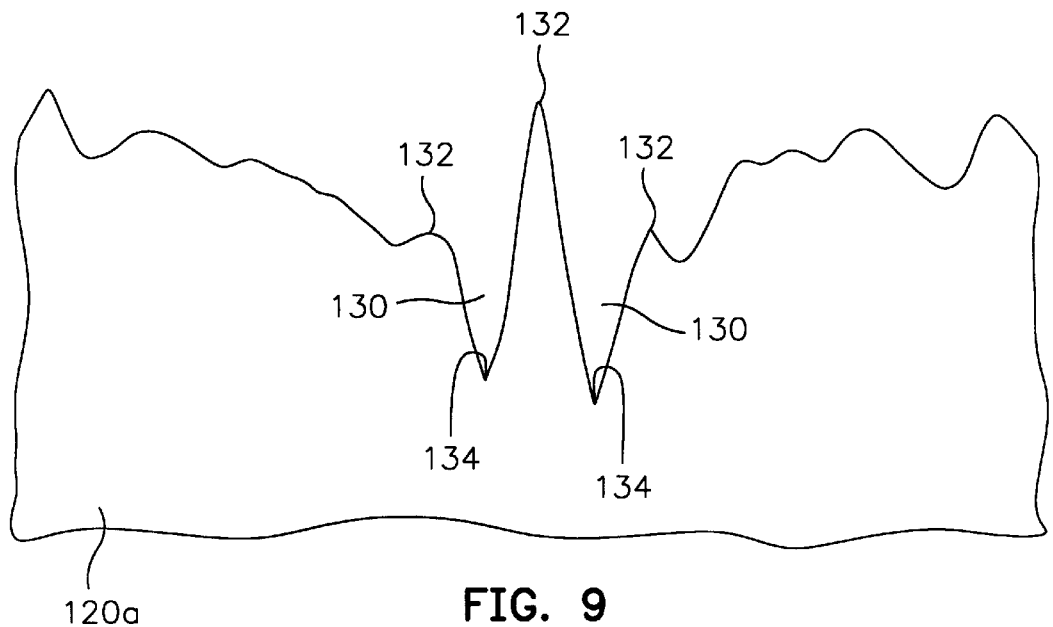
FIG. 9 is a vertical profile of an overcoat for a prior art slider.

FIG. 9 illustrates a vertical profile taken along plane IX—IX of FIG. 8 showing a prior art overcoat layer 120a on the ABS of the center rail 128. This profile shows trenches 130 which are bounded by peaks and valleys 132 and 134 respectively. The maximum peak-to-valley dimension is approximately 10 nm. The preferred material of the slider is AlTiC. The overcoat 120a comprises two layers: a first layer, preferably of Si, under a second layer, preferably of a carbon such as diamond-like carbon (DLC). These layers will be described in more detail hereinafter. In the prior art, the first and second layers of the overcoat 120a are formed by sputter deposition. It would be desirable to reduce the maximum peak-to-valley dimension of the prior art overcoat 120a so as to reduce spacing loss and thereby increase the bit density of the disk drive, as discussed hereinabove.

Figure 10:
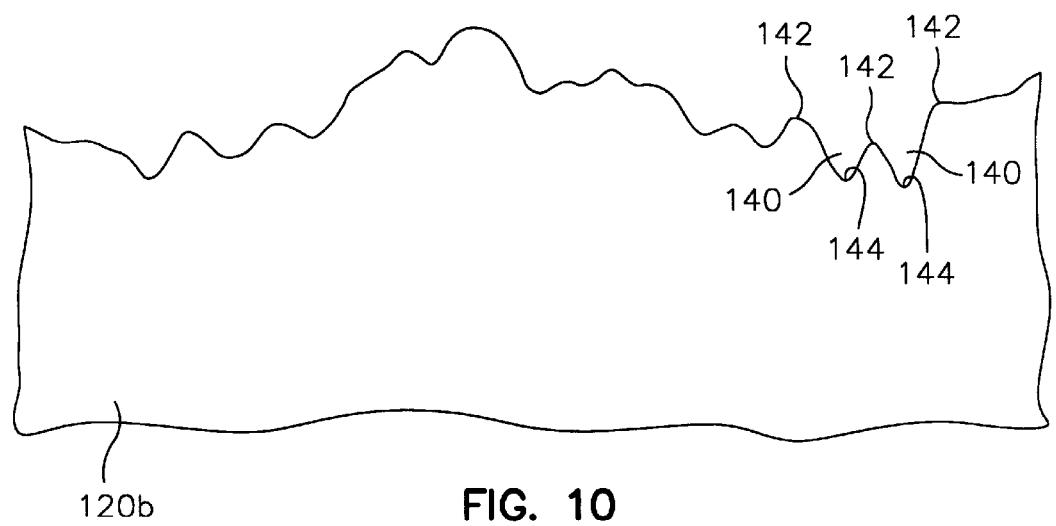
FIG. 10 is a vertical profile of an overcoat for the present slider.
Figure 11:
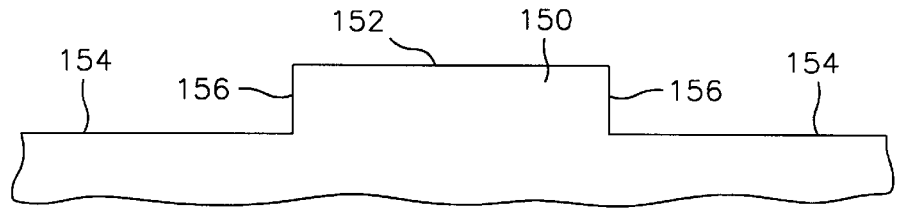
FIG. 11 is a schematic illustration of vertical steps on a surface of an article.

FIG. 10 illustrates a vertical profile taken along plane X—X of FIG. 8 showing the overcoat layer 120b on the ABS of the center rail 128 for one embodiment of the present invention. This profile shows trenches 140 bounded by peaks and valleys 142 and 144. The maximum peak-to-valley dimension is approximately 5 nm which is approximately one-half the peak-to-valley dimension shown for the prior art overcoat 120a in FIG. 9. This improvement results from a novel method, to be described hereinafter, which redeposits sputtered overcoat material from the peaks to the valleys. The present invention, shown in FIG. 10, ensures more complete coverage of the slider and sensitive elements of the magnetic head by filling the trenches and thinning down the overcoat to decrease spacing loss. The slider material and the first and second layers of the overcoat 120b are the same as that described for the prior art in FIG. 9.

Figure 12:
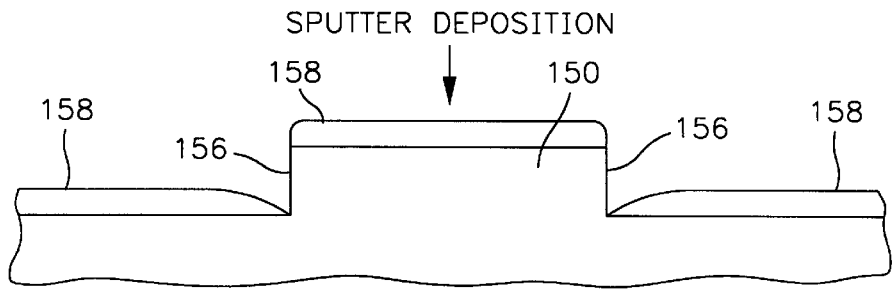
FIG. 12 is a vertical schematic illustration of the first step in the present method showing lack of material coverage on the vertical steps after sputter deposition.

FIGS. 11–15 illustrate the method of the present invention with respect to a slider 150 having an exaggerated profile comprising a top flat surface 152, lower flat surfaces 154 and vertical steps 156 for explanatory purposes. The first step in the method of the invention is to sputter deposit overcoat material 158 on the slider 150. As discussed hereinabove, the overcoat material typically comprises two layers, namely a first layer of adhesion material followed by a carbon layer. Since the aforementioned trenches may have a depth in the order of 10 nm the first layer may be 1 nm followed by a carbon layer of 6 nm. As shown in FIG. 12, the overcoat 158 covers the flat surfaces 152 and 154 but does not cover the steps 156. This is because sputter deposition is very directional. In the prior art, the method ceases at this stage leaving the vertical steps 156 without coverage, resulting in an overcoat with a high profile, as discussed hereinabove.

Figure 13:
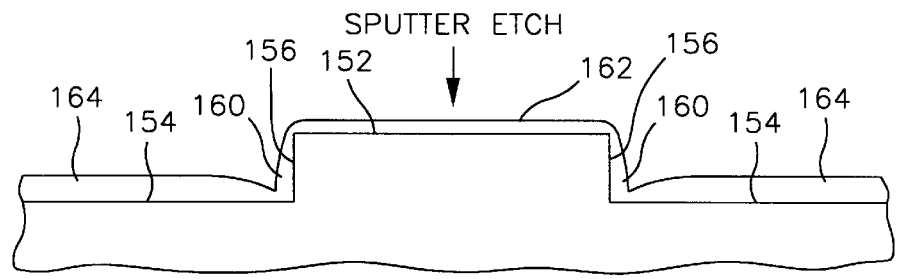
FIG. 13 is a second step in the present method showing material deposited on the vertical steps by redeposition.
Figure 14:
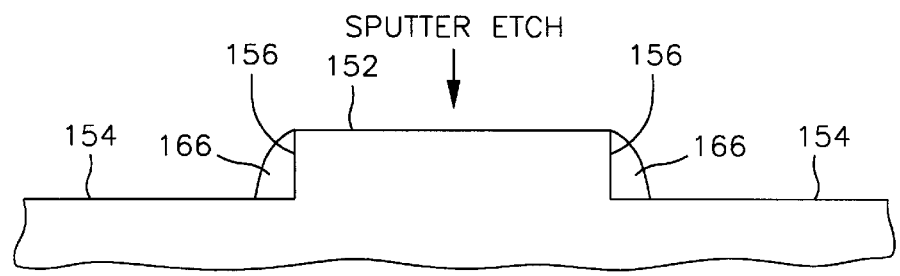
FIG. 14 is an optional third step of the present method wherein additional material is deposited on the vertical steps by sputter etching.
Figure 15:
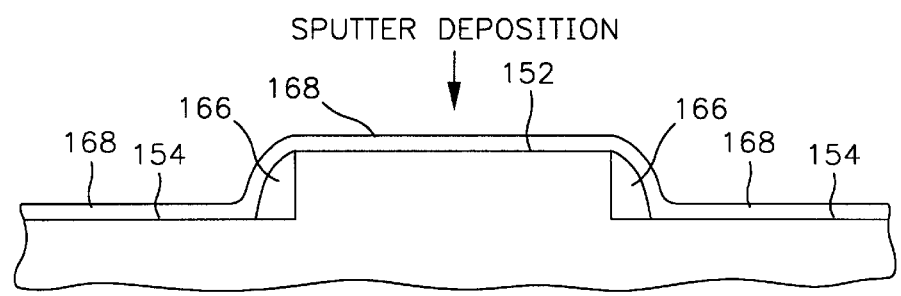
FIG. 15 is an optional step of the present invention wherein a second overcoat is applied after sputter etching.

After sputter deposition, as shown in FIG. 12, the present invention implements a step of sputter etching, as shown in FIG. 13. The step of sputter etching removes overcoat material from the flat surfaces 152 and 154 and redeposits this overcoat material on the steps 156, providing overcoat coverage at 160. In the preferred embodiment a portion of the overcoat, shown at 162 and 164 on the flat surfaces 152 and 154, is not removed by sputter etching so as to ensure that the sputter etching does not damage the aforementioned sensitive elements of the magnetic head. Optionally, the overcoat portions 162 and 164 can be completely removed by sputter etching, as shown in FIG. 14. This exposes the flat surfaces 152 and 154 of the slider 150 and adds additional redeposited material from the flat surfaces to the steps 156, causing increased side wall redeposition at 166, as shown in FIG. 14. If the optional step in FIG. 14 is implemented, another optional step may be employed repeating the sputter deposition step in FIG. 12, as shown in FIG. 15, by forming an overcoat layer 168 on the flat surfaces 152 and 154. The overcoat layer 168 is preferably thinner than the overcoat layer 158 of FIG. 12. FIGS. 13 and 15 illustrate first and second embodiments of the present invention.

Figure 16A:
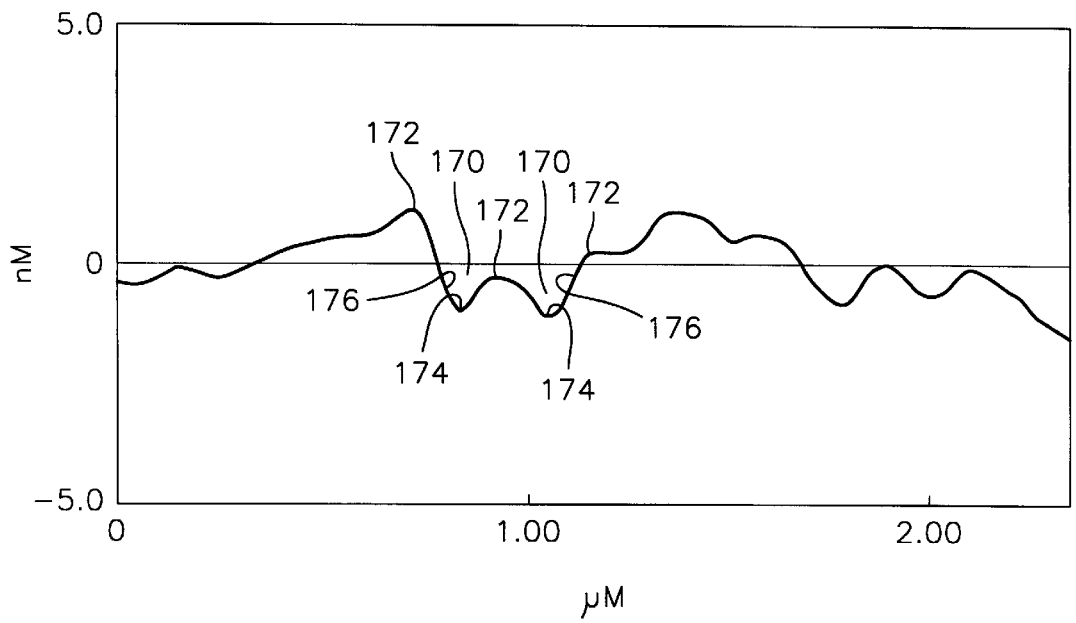
FIG. 16A is a vertical profile of a slider before forming a prior art overcoat thereon.
Figure 16B:
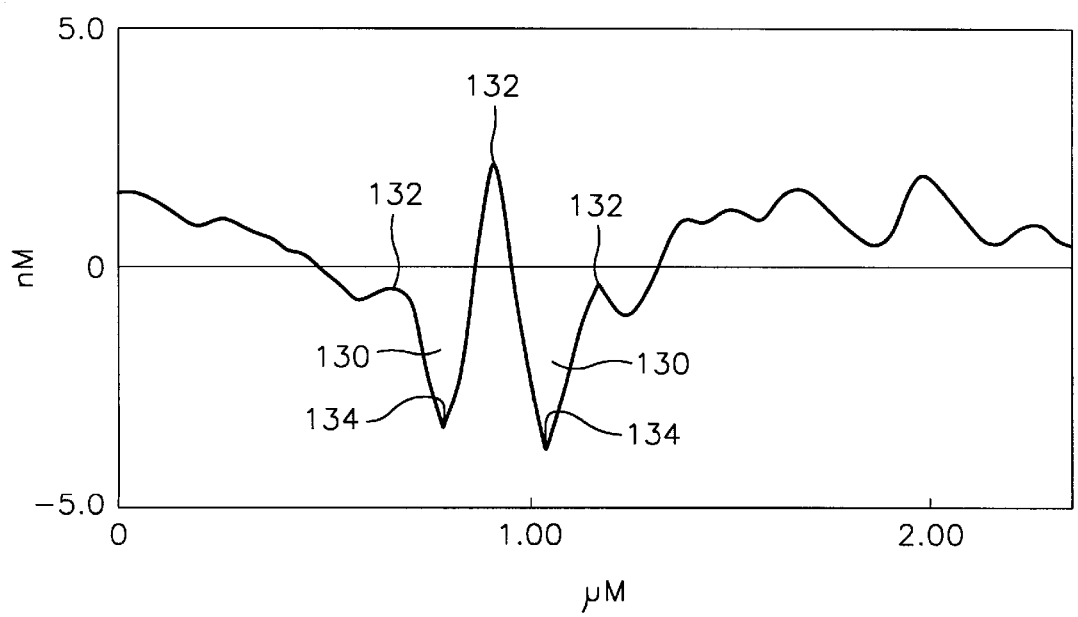
FIG. 16B is a vertical profile of a prior art overcoat on the slider of FIG. 16A.
Figure 17A:
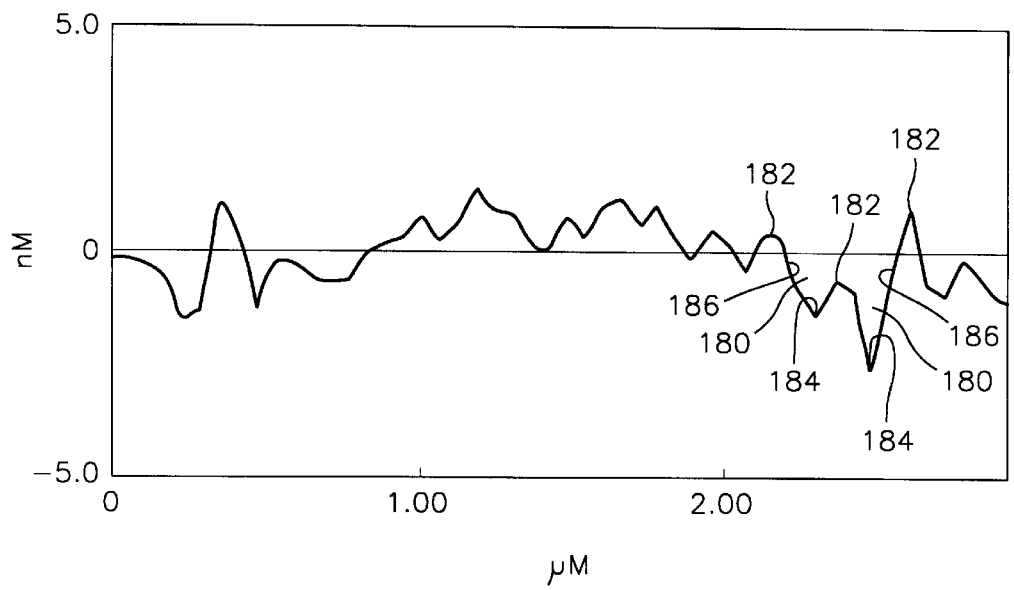
FIG. 17A is a vertical profile of a slider prior to forming an overcoat thereon.
Figure 17B:
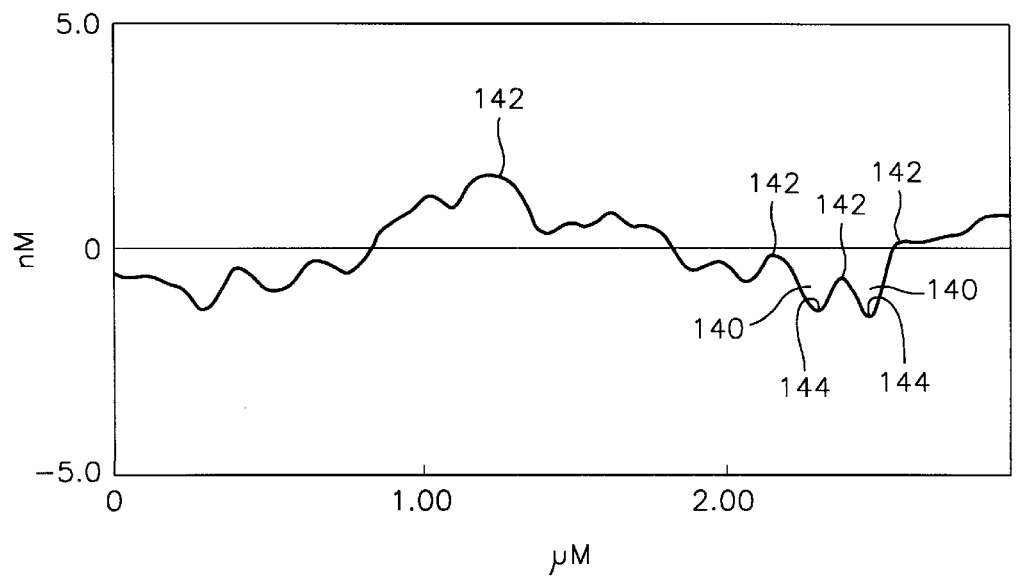
FIG. 17B is a vertical profile of the present invention after forming an overcoat on the slider of FIG. 17A.

FIGS. 16A and 16B are profile traces of a slider before and after forming an overcoat layer resulting from our experimentation with the prior art method. FIGS. 17A and 17B are profile traces of a slider before and after forming an overcoat thereon from our experimentation with the present method. The prior art method and the present method are both a carbon overcoat process for protecting the sensitive elements of the magnetic head from wear and corrosion. The experiments were accomplished on an AlTiC substrate which simulates the slider material. These experiments did not test the overcoat layer on the sensitive elements of the magnetic head, however these tests do indicate scratches or trenches in the lapped portions of the sensitive elements will be covered similarly to the coverage of the slider substrate.

FIG. 16A shows a profile trace of an AlTiC slider prior to forming the prior art overcoat. The uncoated slider has trenches 170 bounded by peaks 172 and valleys 174 with side walls 176 therebetween. A 4 nm overcoat of silicon and carbon layers were deposited by sputter deposition on the slider surface of FIG. 16A, which resulted in a profile trace, as shown in FIG. 16B. The peaks and valleys 132 and 134 in FIG. 16B correspond to the peaks and valleys 172 and 174 in FIG. 16A. It can be seen that the maximum peak-to-valley dimension in FIG. 16A, prior to the overcoat, is approximately 2 nm, whereas after forming the overcoat, as shown in FIG. 16B, the via a maximum peak-to-valley dimension is approximately 6 nm. The increase in the peak-to-valley dimension in FIG. 16B, as compared to FIG. 16A, can be explained on the basis that the sputter deposition resides primarily on the peaks and minimally coats the side walls or fills the trenches. FIG. 16B illustrates the standard prior art overcoat coverage, which is referred to hereinafter as carbon overcoat (COC).

FIG. 17A illustrates a profile trace of an AlTiC slider prior to forming the overcoat thereon. This slider has trenches 180, which have peaks and valleys 182 and 184 with side walls 186 therebetween. An overcoat of silicon and carbon 4 nm thick was deposited on the slider in FIG. 17A, followed by a step of sputter etching until the overcoat material was essentially removed from the peaks 182, followed by a second sputter deposition of overcoat material 4 nm thick. The result is as shown in FIG. 17B, which is the same profile as that shown in FIG. 10. The peaks and valleys 142 and 144 of FIG. 17B correspond to the peaks and valleys 182 and 184 of FIG. 17A. It can be seen from FIG. 17B that the overcoat has significantly filled in the trenches 180 of FIG. 17A, and has not increased the peak-to-valley height shown in FIG. 17A. As explained hereinabove, this is due to the fact that the second step of sputter etching has redeposited the overcoat material from the peaks 182 onto the side walls 186, thereby filling the trenches 180 of FIG. 17A and reducing the depth of the trenches shown in FIG. 17B. Had the aforementioned second sputter deposition of another 4 nm of overcoat material been omitted, the peak-to-valley dimensions in FIG. 17B would obviously have been less. The overcoat material redeposited on side walls to fill the trenches produces an overcoat, referred to hereinafter as an enhanced carbon overcoat (ECOC).

Sliders with ECOC were mounted to suspensions and tested employing a contact start/stop (CSS) tester. It was found that the sliders with ECOC performed at least twice as well as those with COC in terms of durability. Stiction tests of the ECOC and COC sliders showed little difference in performance. Some sliders were tested without performing the last step of depositing a second overcoat; it was found that they performed equally well as sliders with COC with respect to both durability and stiction. This last test implies that the peaks of a slider with ECOC without the second overcoat layer retained a carbon-rich composition.

Further tests were conducted to determine how nickel iron (NiFe) performed with ECOC as compared to COC. In these experiments, silicon substrates were coated with 100 nm of nickel iron. The nickel iron was not lapped. The initial roughness of the nickel iron, due to its crystalline grain morphology, was employed to provide a roughness for testing. In testing the prior art sample, the average roughness $R_a$ of the nickel iron was 0.978 nm. After sputter depositing 4 nm of overcoat material of carbon the average roughness $R_a$ was 1.207 nm. The average roughness $R_a$ was determined with an atomic force microscope (AFM).

Next, the nickel iron sample was tested with the ECOC according to the present invention. The average roughness $R_a$ of the nickel iron prior to ECOC was 1.071 nm. 4 nm of overcoat material was then sputter deposited on the nickel iron followed by sputter etching, which was then followed by sputter depositing another 4 mm of overcoat material of carbon thereon. The average roughness $R_a$ of the nickel iron after ECOC was 0.696 nm. It can be seen that the average roughness of nickel iron with ECOC significantly decreased while the average roughness of nickel iron with COC increased. This roughness discrepancy can be explained by the fact that in the COC process the carbon overcoat remains on the high points of the nickel iron, whereas in the ECOC process the overcoat material is removed from the high points and redeposited in the trenches. This is even more dramatic when the last step of depositing a second overcoat layer is omitted in the ECOC process. An experiment showed that the average roughness of the nickel iron prior to ECOC was 0.795 nm and after ECOC, without the second layer, was 0.406 nm. This shows that the second deposition step in ECOC adds overcoat material to the high points on the nickel iron which increases the roughness slightly over ECOC without the second step.

TABLE 1

| Initial Overcoat Thickness | Roughness before initial overcoat application ECOC (Ra) | Roughness after ECOC (Ra) | Ra Ratio |
| --- | --- | --- | --- |
| 40 Å | 9.0 Å | 6.0 Å | 1.50 |
| 70 Å | 8.4 Å | 5.4 Å | 1.55 |
| 125 Å | 9.9 Å | 5.4 Å | 1.75 |

Table 1 shows the results of Applicant's 3-step process of applying an initial overcoat of various thicknesses, sputter etching the first overcoat and then applying a second overcoat of 40 Å on 1,000 Å of nickel iron. The first column shows the initial overcoat thickness in angstroms, 1 Å being equal to ¹/₁₀ of a nm. The second column shows the roughness $R_a$ of the nickel iron before the initial overcoat is applied. Column 3 shows the roughness $R_a$ of the overcoat after the three-step ECOC, and the fourth column shows the ratio of the roughnesses before and after the ECOC. It can be seen that the roughness reduction when ECOC is employed is 50% for an initial coat of 40 Å and a 75% reduction for an initial coat of 125 Å.

We conducted a corrosion test on: (1) nickel iron with ECOC with a second overcoat; (2) nickel iron with ECOC without the second overcoat; and (3) nickel iron with the prior art COC. Each of these samples were subjected to chlorine-containing solutions. It was found that the ECOC sample without the second overcoat performed equally well as the nickel iron with ECOC with the second overcoat. Both of the ECOC samples had better corrosion resistance than the nickel iron with the prior art COC.

Figure 18A:
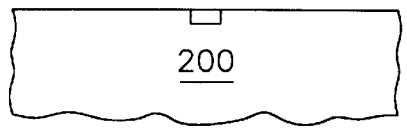
FIGS. 18A–18H show various steps in forming an overcoat on a slider according to the present invention.
Figure 18B:
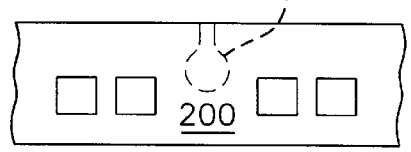
Figure 18C:
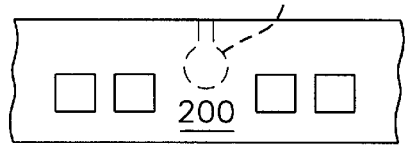
Figure 18D:
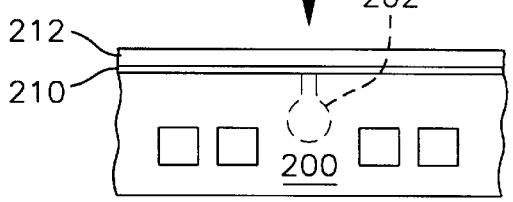
Figure 18E:
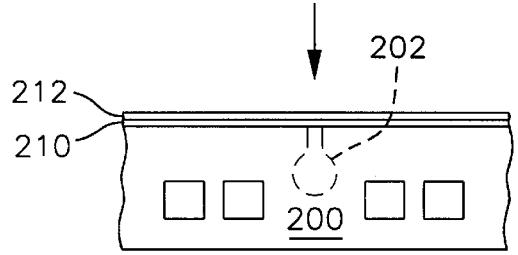
Figure 18F:
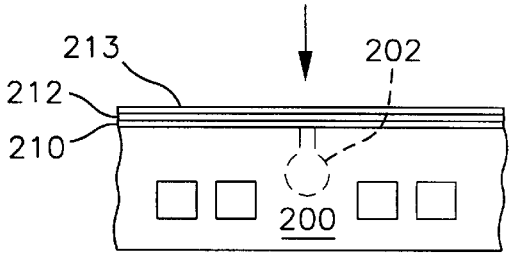
Figure 18G:
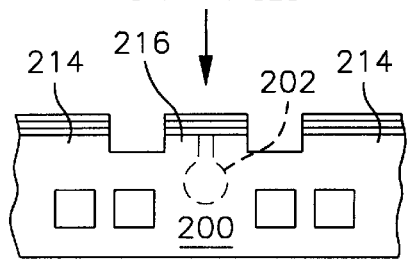
Figure 18H:
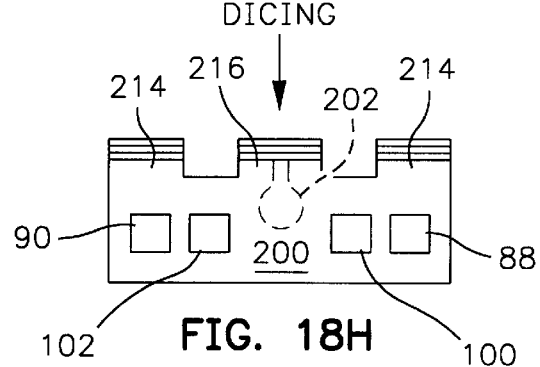

It should be understood that the present invention can be employed for providing an overcoat on articles other than a slider and sensitive elements of a magnetic head. FIGS. 18A–18G show the various steps for preparing and applying an overcoat to a slider, whereas FIGS. 19A–19C show various steps for applying an overcoat to a magnetic disk. The invention is particularly useful for any article which has scratches and the overcoat is initially applied by sputter etching. In FIG. 18A a magnetic head 202 is formed on a slider substrate 200. In FIG. 18B the substrate has been diced to produce a row bar containing the magnetic head, after which the row bar is lapped to form a desirable magnetic head geometry on the air bearing surface, as shown in FIG. 18C. This lapping leaves minute scratches or trenches which are particularly troublesome to the sensitive elements of the magnetic head 202 from the standpoint of wear and corrosion. In FIG. 18D an overcoat, which may comprise a silicon adhesion layer 210, and a carbon layer 212, is deposited by sputter deposition on the substrate 200. The overall thickness of the overcoat may be 7 to 10 nm with the adhesion layer 210 being 1 nm. The adhesion layer 210 is primarily required for adhering the carbon layer to the nickel iron components of the magnetic head. Next, the overcoat is sputter etched, as shown in FIG. 18E, which causes overcoat material on the flat surfaces and peaks to be redeposited on the side walls of the trenches, thereby filling the trenches, as described hereinabove. The overcoat may be milled completely away from the flat surfaces and peaks or partially left thereon to ensure that the sensitive elements of the magnetic head are not damaged. If the overcoat layer is completely etched from the flat surfaces a second overcoat 213 of carbon may be applied of less thickness than the first overcoat, as shown by the step in 18F. Side rails 214 and a center rail 216 are then formed by lapping or sputter etching, as shown in FIG. 18G. The substrate is then diced into individual sliders as shown in FIG. 18H. It should be understood that the sputter etching step in FIG.18E may be accomplished by R.F. sputter etching or D.C. sputter etching. In lieu of sputter etching, ion beam milling may be employed.

FIG. 19A illustrates a magnetic disk 220 prior to the application of an overcoat. In FIG. 19B an overcoat, which may comprise a carbon layer 224, is applied by sputter deposition. In FIG. 19C the overcoat is sputter etched causing low spots in the roughness of the disk to be filled in. Again, the entire overcoat on the flat surfaces may be milled away or partially left. If they are entirely milled away, an optional second overcoat 226 may be applied by sputter deposition as illustrated in FIG. 19D.

It should be understood that while the materials described hereinabove are preferred, other suitable materials can be used for the slider, the silicon adhesion layer and the carbon layer without departing from the spirit of the invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A slider for a magnetic disk drive, the slider having an air bearing surface (ABS) which has a nominal surface plane, the slider comprising:
   the slider being substantially of a first material which has said ABS;
   the ABS having a plurality of trenches bounded by peaks and valleys with respect to said nominal surface plane; and
   a second material in the valleys, the second material substantially comprising sputter etched redeposited material.

2. The slider as claimed in claim 1 wherein said sputter etched redeposited material comprises diamond-like carbon.

3. The slider as claimed in claim 2 wherein said sputter etched redeposited material is sputter etched from diamond-like carbon previously deposited on said peaks.

4. The slider as claimed in claim 1 including:
   a first dimension between a highest peak and a lowest valley; and
   said second material reducing said dimension to less than 5 nm.

5. The slider as claimed in claim 1 further comprising:
   a third material on and covering said peaks; and
   said sputter etched redeposited material being sputter etched from said third material.

6. The slider as claimed in claim 5 wherein said sputter etched redeposited material and said third material comprise diamond-like carbon.

7. The slider as claimed in claim 6 wherein said first material comprises AlTiC.

8. The slider as claimed in claim 7 including:
   a fourth material in the valleys of the trenches; and
   said fourth material being an adhesive.

9. The slider as claimed in claim 8 wherein said adhesive comprises Si.

10. The slider as claimed in claim 9 including:
    a first dimension between a highest peak and a lowest valley; and
    said second material reducing said dimension to less than 5 nm.

11. A magnetic disk for a magnetic disk drive, the magnetic disk having a surface which has a nominal surface plane, the magnetic disk comprising:
    the magnetic disk being substantially of a first material which has said surface;
    the surface having a plurality of trenches bounded by peaks and valleys with respect to said nominal surface plane; and
    a second material in the valleys, the second material substantially comprising sputter etched redeposited material.

12. The magnetic disk as claimed in claim 11 wherein said sputter etched redeposited material comprises diamond-like carbon.

13. A magnetic disk drive comprising:
    a slider having an air bearing surface;
    the slider including a magnetic head and having sensitive elements exposed at said ABS;
    the slider being of a first material, the first material forming said ABS;
    the ABS having a plurality of trenches bounded by peaks and valleys with respect to a nominal surface plane of said ABS;
    a second material in the valleys, the second material being sputter etched redeposited material;
    a frame;
    a magnetic disk rotatably supported on the frame;
    a support mounted on the frame for supporting the slider with the magnetic head in a transducing relationship with the magnetic disk;
    a motor for rotating the magnetic disk;
    an actuator connected to the support for moving the magnetic head to multiple positions with respect to said magnetic disk; and
    circuitry connected to the magnetic head, to the motor and to the actuator for exchanging signals with the magnetic head, for controlling movement of the magnetic disk and for controlling the position of the magnetic head.

14. A magnetic disk drive as claimed in claim 13 wherein said sputter etched redeposited material comprises diamond-like carbon.

15. A magnetic disk drive as claimed in claim 14 wherein said first material comprises AlTiC.

16. A magnetic disk drive as claimed in claim 16 including:
    a third material on and covering said peaks;
    said third material comprising diamond-like carbon; and
    said sputter etched redeposited material comprising diamond-like carbon sputter etched from said third material.

17. A magnetic disk drive as claimed in claim 16 wherein the magnetic head includes:
    a write head including:
        at least one coil layer and an insulation stack;
        the coil layer being embedded in the insulation stack;
        first and second pole pieces connected at a back gap and having pole tips with edges forming a portion of the ABS;
        the insulation stack being sandwiched between the first and second pole pieces; and
        a write gap layer sandwiched between the pole tips of the first and second pole pieces and forming a portion of the ABS; and a read head including:
            a magnetoresisitve (MR) sensor, first and second gap layers and first and second shield layers; and
            the MR sensor being sandwiched between the first and second gap layers and the first and second gap layers being sandwiched between the first and second shield layers.

18. A slider for a magnetic disk drive, comprising:
    a first material;
    an air bearing surface (ABS) formed by said first material;
    the ABS having a plurality of trenches bounded by peaks and valleys with respect to a nominal surface plane of said ABS;

a second material in said valleys; and said second material substantially comprising redeposited diamond-like carbon (DLC).

19. A slider as claimed in claim 18 wherein said redeposited DLC comprises sputter etched redeposited DLC.

20. A slider as claimed in claim 18 wherein said redeposited DLC is redeposited from DLC previously deposited on said peaks.

21. A slider as claimed in claim 18 wherein said redeposited DLC is sputter etched from DLC previously sputter deposited on said peaks.

22. A slider as claimed in claim 18 further comprising:

a third material on and covering said peaks;

said third material comprising DLC; and said redeposited DLC comprising DLC sputter etched from said third material.

23. A slider as claimed in claim 18 further comprising:

said first material comprising AlTiC;

a third material sputter deposited on said peaks;

said third material comprising DLC; and said redeposited DLC comprising DLC sputter etched from said third material.

24. A slider as claimed in claim 18 further comprising:

said redeposited DLC is redeposited from DLC previously deposited on said peaks; and wherein DLC is substantially absent from said peaks.

25. A slider as claimed in claim 18 further comprising:

said first material comprising AlTiC; and said redeposited DLC is redeposited from DLC previously deposited on said peaks.

26. A slider as claimed in claim 18 further comprising:

a third material on and covering said peaks; and said third material comprising DLC.

27. A slider as claimed in claim 26 further comprising:

a first dimension between a highest peak and a lowest valley; and said second material reducing said dimension to less than 5 nm.

* * * * *